(12) United States Patent
Glaesener et al.

(10) Patent No.: US 8,459,977 B2
(45) Date of Patent: Jun. 11, 2013

(54) MOLDED ARTICLE TRANSFER DEVICE

(75) Inventors: Pierre Glaesener, Bissen (LU); Halter Christophe, Selange (BE)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 76 days.

(21) Appl. No.: 13/202,787

(22) PCT Filed: Nov. 3, 2010

(86) PCT No.: PCT/CA2010/001714
§ 371 (c)(1),
(2), (4) Date: Aug. 23, 2011

(87) PCT Pub. No.: WO2011/069237
PCT Pub. Date: Jun. 16, 2011

(65) Prior Publication Data
US 2011/0305786 A1 Dec. 15, 2011

Related U.S. Application Data

(60) Provisional application No. 61/258,305, filed on Dec. 10, 2009.

(51) Int. Cl.
*B29C 45/40* (2006.01)
(52) U.S. Cl.
USPC ............ 425/139; 264/334; 425/556; 425/557
(58) Field of Classification Search
USPC .................. 425/139, 557, 556; 264/334, 335, 264/336
See application file for complete search history.

(56) References Cited

U.S. PATENT DOCUMENTS

| | | | |
|---|---|---|---|
| 4,438,065 A | 3/1984 | Brown | |
| 4,589,840 A | 5/1986 | Schad | |
| 4,715,806 A | 12/1987 | Ehrler et al. | |
| 4,981,634 A | 1/1991 | Maus et al. | |
| 5,037,597 A | 8/1991 | McGinley et al. | |
| 5,141,430 A | 8/1992 | Maus et al. | |
| 5,244,606 A | 9/1993 | Maus et al. | |
| 6,551,093 B2 * | 4/2003 | Taha | 425/556 |
| 6,939,504 B2 | 9/2005 | Homann et al. | |
| 7,351,050 B2 | 4/2008 | Vanderploeg et al. | |
| 2004/0084809 A1 | 5/2004 | Vanderploeg et al. | |

FOREIGN PATENT DOCUMENTS

CA 2546584 A1 6/2005

OTHER PUBLICATIONS

PCT International Search Report, Feb. 2, 2011, Zhang, Pengfei, 4 pages.

* cited by examiner

*Primary Examiner* — Tim Heitbrink
(74) *Attorney, Agent, or Firm* — Husky Intellectual Property Services

(57) ABSTRACT

A molded article transfer device (150, 250) is described herein that is associated, in use, with an injection mold (100, 200). The molded article transfer device (150, 250) includes a transfer structure (151, 251) that defines, amongst other things, a first aperture (154A) that is structured to receive a first molded article (102A) from a first mold stack (106A, 206A) of the injection mold (100). The transfer structure (151, 251) also defines a first branch channel (156A) and a first trunk channel (158A) through which the first molded article (102A) is passable. The first branch channel (156A) connects the first aperture (154A) with the first trunk channel (158A) for passing, in use, the first molded article (102A) thereto, whereafter it passes through the first trunk channel (158A) towards an exit (164A) thereof.

25 Claims, 15 Drawing Sheets

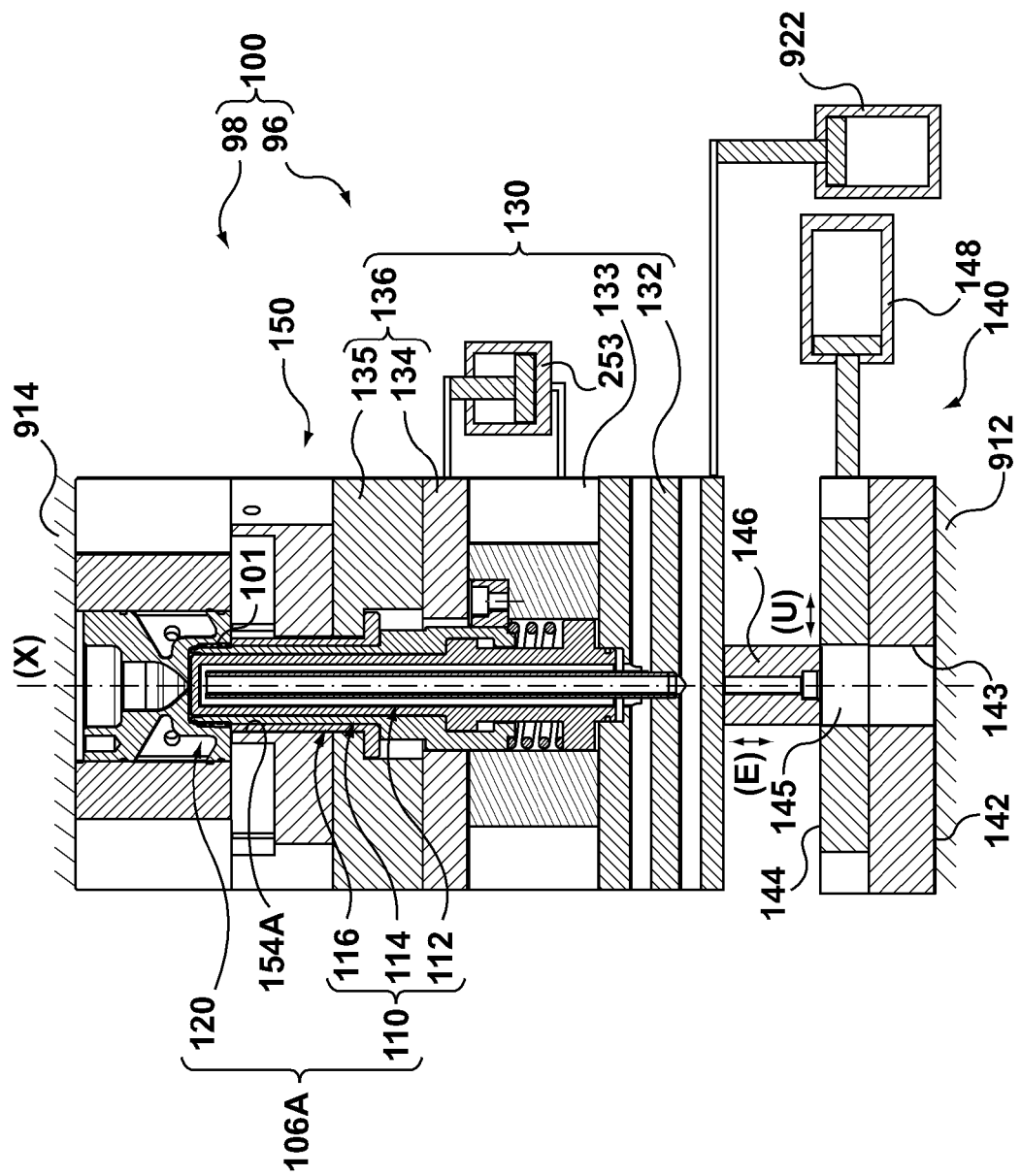

MOLDED ARTICLE TRANSFER DEVICE

TECHNICAL FIELD

The non-limiting embodiments disclosed herein generally relate to a molding apparatus, and more particularly to a molded article transfer device and a controller to execute a molding process.

BACKGROUND

U.S. Pat. No. 7,351,050 to Vanderploeg et al, published on Apr. 1, 2008 teaches a servo side shuttle apparatus and method for a molding machine includes structure and/or steps whereby a shuttle plate is disposed adjacent at least one of a first mold half and a second mold half of the molding machine. A guidance assembly is coupled to the mold half and guides the shuttle plate linearly across a molding face of the mold half. A drive mechanism is provided to drive the shuttle plate in a linear direction. An operation structure is coupled to the shuttle plate and is configured to perform an operation on a molded article disposed either in the mold cavity or on the mold core. The operation may include removing the molded article from a mold core, applying a label to a mold cavity, and/or closing the lid of a molded article while it is resident on the mold core.

U.S. Pat. No. 5,037,597 to McGinley et al, published on Aug. 6, 1991 teaches an injection molding apparatus and process for forming a plurality of first parts and a plurality of complementary second parts during a single molding cycle has a system for removing parts molded during each cycle and for assembling the parts into finished articles. The system includes a plurality of rotatable suction cups for removing the parts and for aligning them with and inserting them into a series of loading ports in a central mold member so as to mate respective ones of the first parts with respective ones of the second parts. The central mold member further has internal chute assemblies for conveying assembled articles away from the mold. A novel system for driving the rotatable suction cups uses a rotatable member mounted to various mold halves and a camming arrangement whereby relative movement of the mold halves during the mold closing and opening motions causes rotation of the suction cups.

U.S. Pat. No. 4,715,806 to Ehrler et al, published on Dec. 29, 1987 teaches a sprue part that is cut and removed from the injection mold part during the manufacture of information storage disks by an injection molding process. The highly sensitive molding of an information storage disk is protected from damage by the sprue and the deposition of dust particles during stripping by this process. The sprue is punched into a part serving as the die of the injection molding tool and subsequently removed, in particular by suction, through an orifice leading from inside the part, together with the dust particles generated in the punching process. Preferably, the sprue is punched out and removed with the injection molding tool closed. The injection molding tool must be opened only after the sprue and the dust have already been removed, thus ensuring that the molded product has an especially good quality.

U.S. Pat. Nos. 4,981,634 and 5,141,430 to Maus et al, published on Jan. 1, 1991, and Aug. 25, 1992, respectively, teach an injection molding process creates a micro clean room environment inside a mold cavity which can stay closed to airborne contaminants while ejecting and transferring the molded part out. The molded part is formed and solidified at a parting line plane within the mold cavity, then is carried rearward on the movable mold insert to a second plane where it is stripped off and transferred out through a discharge aperture which is open when the mold cavity is in the second plane but closed off when in the first plane. The aperture faces substantially downward to prevent entry by upwelling thermal air currents. External supplied filtered gas can provide positive pressure through vents within the moldset's internal space. This maximizes mold and part cleanliness while speeding up "mold-open" cycle; may eliminate HEPA filters/enclosures and robots. Optical disks, lenses, food packaging and medical parts are suggested uses.

U.S. Pat. No. 4,589,840 to Schad, published on May 20, 1986 teaches an apparatus for continuously receiving and collecting molded articles from a continuously cycling injection molding machine where the articles are collected sequentially and continuously in a uniform physical position or orientation.

U.S. Pat. No. 6,939,504 to Homann et al, published on Sep. 6, 2005 teaches a method and system for producing hollow rib structures for trim components and panels using gas assisted injection molding. Movable insert members are provided in the mold cavity, particularly at the ends of the structural rib members. After the plastic material is injected into the mold cavity, the plastic is packed in the mold, and the insert members are locked in position. Selectively activatable locking mechanisms are used to lock up the insert members. Thereafter, gas or another fluid is introduced into the rib members in order to provide hollow channels therein. Movement of the insert members provides a recess or groove for placement of the displaced resin from the rib members. The displaced resin material completes the formation of the molded plastic article.

U.S. Pat. No. 5,244,606 to Maus et al, published on Sep. 14, 1993 teaches a molded disk is transferred out of the mold with short-stroke low-mass motions of a pair of mechanical guides which can grip, then release, the O.D. edge of the molded disk, when acting in coordination with movable mold members having undercuts for molded-on retention of the inner portion of the molded disk and/or sprue. Acting together, the disk is stripped off the molding surfaces and can be oriented in a second vertical plane to freely drop out an aperture in the mold, to exit through a discharge chute. Two ways of separating the sprue from the disk are shown, with a molded-in centerhole being preferred. This method and apparatus for transferring the molded disk out faster by gravity discharge wherein an optical disk mold can be enclosed against airborne dirt throughout molding cycles.

U.S. Pat. No. 4,438,065 to Brown et al, published on Mar. 20, 1984 teaches an improvement in an injection molding apparatus for a container, where the apparatus includes a core defining the interior of the container and first means within the core for initiating ejection of a molded container from the core. The improvement consists of second means adjacent the rim of the molded container for blowing a gaseous material toward the container rim, thereby completing ejection by urging the container away from the core.

SUMMARY

According to an aspect described herein, there is provided a molded article transfer device that is associated, in use, with an injection mold. The molded article transfer device includes a transfer structure that defines, amongst other things, a first aperture that is structured to receive a first molded article. The transfer structure also defines a first branch channel and a first trunk channel through which the first molded article is passable. The first branch channel connects the first aperture with the first trunk channel for passing, in use, the first molded article thereto, whereafter it passes through the first trunk channel towards an exit thereof.

According to another aspect described herein, there is provided a controller including instructions being embodied in a controller-usable memory of the controller, the instructions for directing the controller to execute a molding process. The molding process includes: closing a first mold stack of an injection mold; molding a first molded article within the first mold stack; opening the first mold stack; arranging the first mold stack to eject the first molded article into the first aperture; and dispensing fluid through a first nozzle that is defined by the transfer structure to urge the first molded article that is received in the first aperture to pass through a first branch channel towards a first trunk channel that are defined by the transfer structure.

These and other aspects and features will now become apparent to those skilled in the art upon review of the following description of specific non-limiting embodiments in conjunction with the accompanying drawings.

DETAILED DESCRIPTION OF THE DRAWINGS

The detailed description of illustrative (non-limiting) embodiments will be more fully appreciated when taken in conjunction with the accompanying drawings, in which:

FIGS. 6A-6G depict a sequence of section views of the portion the injection mold of FIG. 2A further including an in-mold shutter that illustrate the configuration thereof during various steps of a non-limiting injection molding process;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON-LIMITING EMBODIMENT(S)

Figure 1:
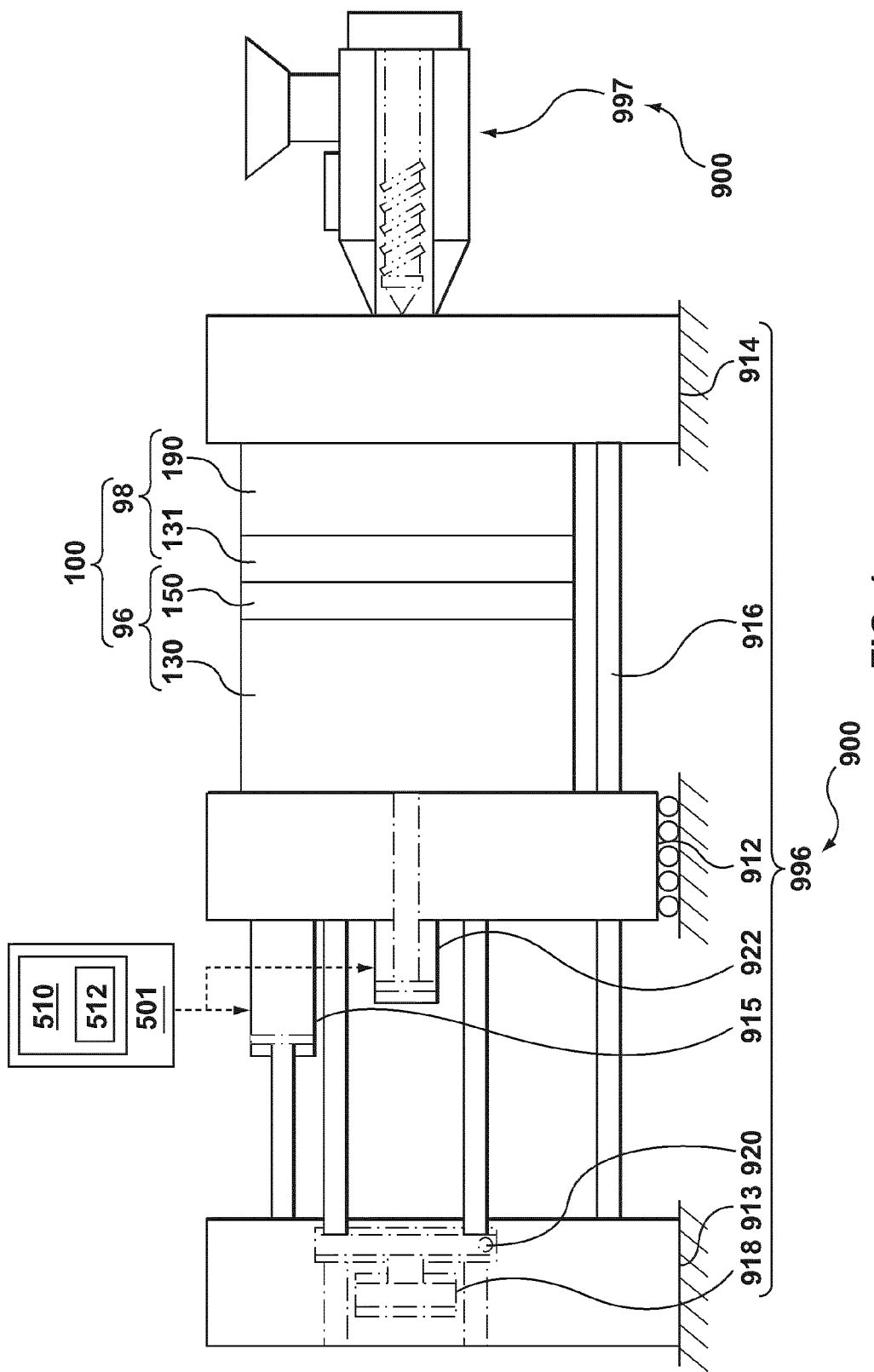
FIG. 1 depicts a schematic representation of an injection molding system having a non-limiting embodiment of an injection mold arranged therein.

FIG. 1 depicts a schematic representation of an injection molding system 900 with a non-limiting embodiment of an injection mold 100 arranged therein. The injection mold 100 is operable to mold a first molded article 102A (FIG. 2B or 4) such as, for example, a container closure.

In the description of the injection molding system 900 and the injection mold 100 that follows many of the components thereof are known to persons skilled in the art, and as such these known components will not be described in detail herein. A detailed description of these known components may be referenced, at least in part, in the following reference books (for example): (i) "Injection Molding Handbook" authored by OSSWALD/TURNG/GRAMANN (ISBN: 3-446-21669-2), (ii) "Injection Molding Handbook" authored by ROSATO AND ROSATO (ISBN: 0-412-10581-3), (iii) "Injection Molding Systems" 3rd Edition authored by JOHANNABER (ISBN 3-446-17733-7) and/or (iv) "Runner and Gating Design Handbook" authored by BEAUMONT (ISBN 1-446-22672-9).

The injection molding system 900 shown in FIG. 1 is shown to include, but is not limited to, a clamping assembly 996 and an injection assembly 997.

By way of example, the clamping assembly 996 described hereafter is representative of a typical three-platen variety although no such specific limitation on the generality of the construction and/or operation thereof is intended. As such the clamping assembly 996 may have a different construction, such as, for example, one having only two-platens. That being said, the non-limiting embodiment of the clamping assembly 996 includes, amongst other things, a moving platen 912, a stationary platen 914, a clamp block 913, and a tie bar 916. The tie bar 916 links the stationary platen 914 with the clamp block 913, and moreover slidably supports the moving platen 912 thereon. While for the sake of simplicity of depiction only one tie bar 916 is shown, it is typical to provide four such tie bars 916, one extending between each of the four corners of the moving platen 912, the stationary platen 914, and the clamp block 913. The clamping assembly 996 also includes a platen-moving actuator 915 (such as, for example, a hydraulic actuator, a pneumatic actuator, an electro-mechanical actuator, or the like) that is connected between the moving platen 912 and the clamp block 913. The platen-moving actuator 915 is operable, in use, to move the moving platen 912 with respect to the stationary platen 914 and thus move a first mold half 96 with respect to a second mold half 98 that are mounted thereto, respectively. The clamping assembly 996 further includes a clamp actuator 918 and a clamp shutter 920 in association with the clamp block 913. The clamp shutter 920 is operable, in use, to selectively connect the clamp actuator 918 with the moving platen 912 for sake of a clamping together of the first mold half 96 and the second mold half 98. Lastly, the clamping assembly 996 may also include an ejector actuator 922 (such as, for example, a hydraulic actuator, a pneumatic actuator, an electro-mechanical actuator, or the like) that is associated with the moving platen 912. The ejector actuator 922 is connectable to a structure that is associated with the first mold half 96. The structure of the first mold half 96 is driven, in use, with actuation of the ejector actuator 922, whereby an operation is performed, such as, for example, ejecting the first molded article 102A (FIG. 4) from the first mold half 96.

By way of example, the injection assembly 997 described hereafter is representative of a typical reciprocating screw variety although no specific limitation on the generality of a construction and/or operation thereof is intended. As such the injection assembly 997 may have a different construction, such as, for example, one having separate plasticizing and injection means (i.e. so-called two stage variety). The injection assembly 997 is operable to melt and inject a molding material, such as, for example, Polyethylene or Polyethyleneterephthalate (PET) through a machine nozzle (not shown) and into a melt distribution apparatus 190 (e.g. hot runner, cold runner, insulated runner, or the like) that is associated with the second mold half 98. The melt distribution apparatus 190 in turn directs the molding material into one or more molding cavity 101 (FIG. 2A) that are defined within the injection mold 100 with the first mold half 96 and the second mold half 98 being closed and clamped together.

Figure 2A:
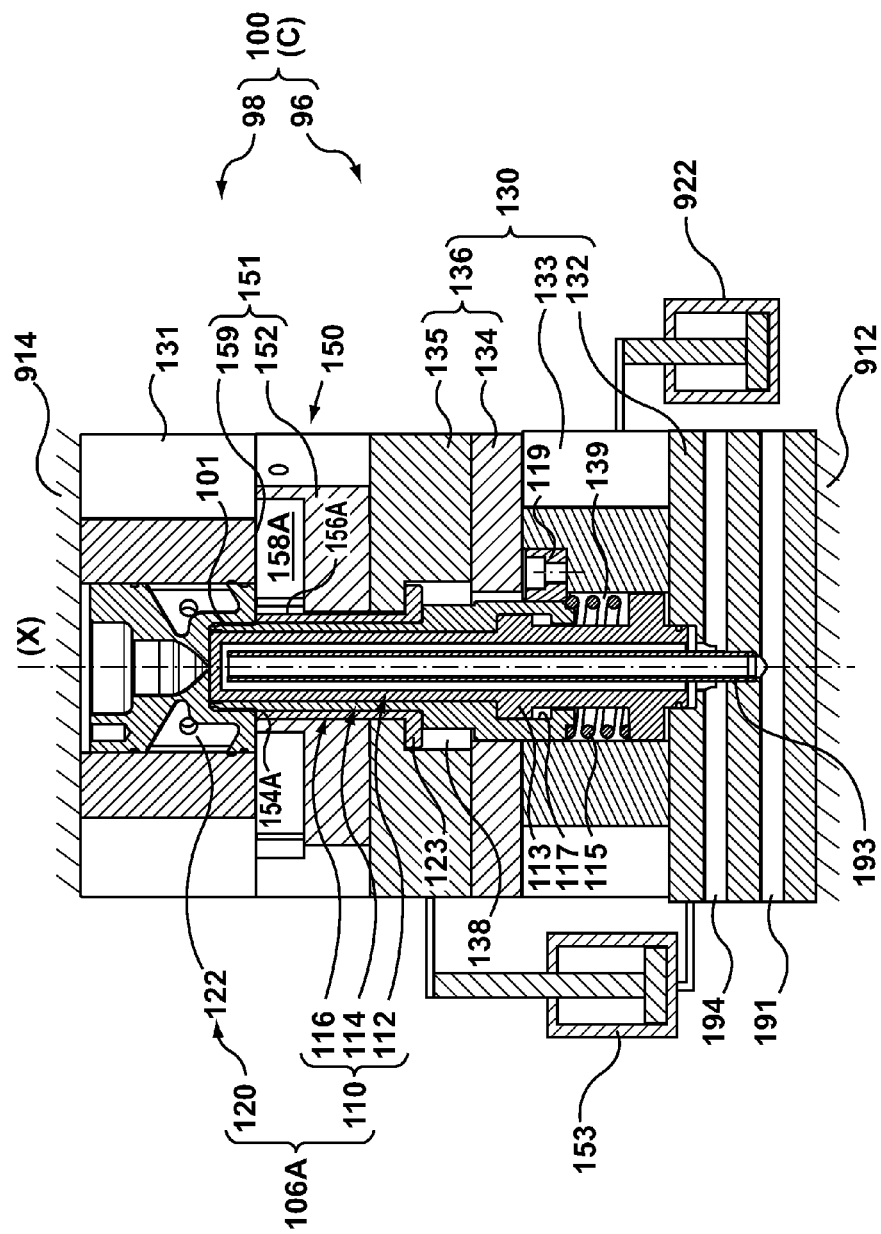
FIG. 2A depicts a section view through a portion of the injection mold depicted in FIG. 1 arranged in a mold closed configuration, and of a molded article transfer device that is associated therewith.

The focus of the description shall now shift to the construction and operation of the non-limiting embodiment of the injection mold 100 shown in FIG. 2A including a non-limiting embodiment of a molded article transfer device 150 that is associated therewith. The molded article transfer device 150 is operable to transfer the first molded article 102A that is received from a first mold stack 106A of the injection mold 100.

As shown in FIG. 2A, the first mold half 96 includes a first mold shoe 130 to which a first stack portion 110 of the first mold stack 106A and the molded article transfer device 150 are connected. The second mold half 98 includes a second mold shoe 131 to which a second stack portion 120 of the first mold stack 106A is connected. The first stack portion 110 and the second stack portion 120 are positioned, in use, relative to each other, along a mold-stroke axis X of the injection mold 100, to close and open a molding cavity 101 that is defined therebetween for molding and ejecting the first molded article 102A (FIG. 2A).

The first stack portion 110 of the first mold stack 106A includes an inner core 112, an outer core 114, and a stripper sleeve 116 that cooperate, in use, with a cavity insert 122 of the second stack portion 120 to define the molding cavity 101.

The outer core 114 is slidably arranged around the inner core 112 to accommodate, in use, relative movement thereof along the mold-stroke axis X, a technical effect of which may include, for example, the release of a seal portion 103 (FIG. 6D) of the first molded article 102A. Likewise, the stripper sleeve 116 is slidably arranged around the outer core 114 to accommodate, in use, the relative movement thereof along the mold-stroke axis X, a technical effect of which may include, for example, the stripping of the first molded article 102A from the outer core 114.

As previously alluded to, the outer core 114 and the inner core 112 are slidably retained together to limit, in use, the relative movement thereof, in use, along the mold-stroke axis X. For example, the inner core 112 may be structured to define a bayonet 113 and the outer core 114 structured to define a bayonet pocket 117, wherein the bayonet 113 and the bayonet pocket 117 are configured to cooperate, when rotatably engaged, to slidably retain the outer core 114 about the inner core 112. In operation the inner core 112 and the outer core 114 are kept rotatably engaged by a key 119. The key 119 is fixed to the second core retainer 133 such that a portion thereof extends into the passageway 139 with which to cooperate with the outer core 114 to maintain an angular orientation thereof with respect to the inner core 112.

The first stack portion 110 further includes a resilient member 115 that is arranged between the inner core 112 and the outer core 114, and wherein the resilient member 115 is arranged to bias the outer core 114 towards a forward limit of travel with respect to the stripper sleeve 116 that corresponds with their relative arrangement during the molding of the first molded article 102A—as shown in FIG. 2A.

Figure 2B:
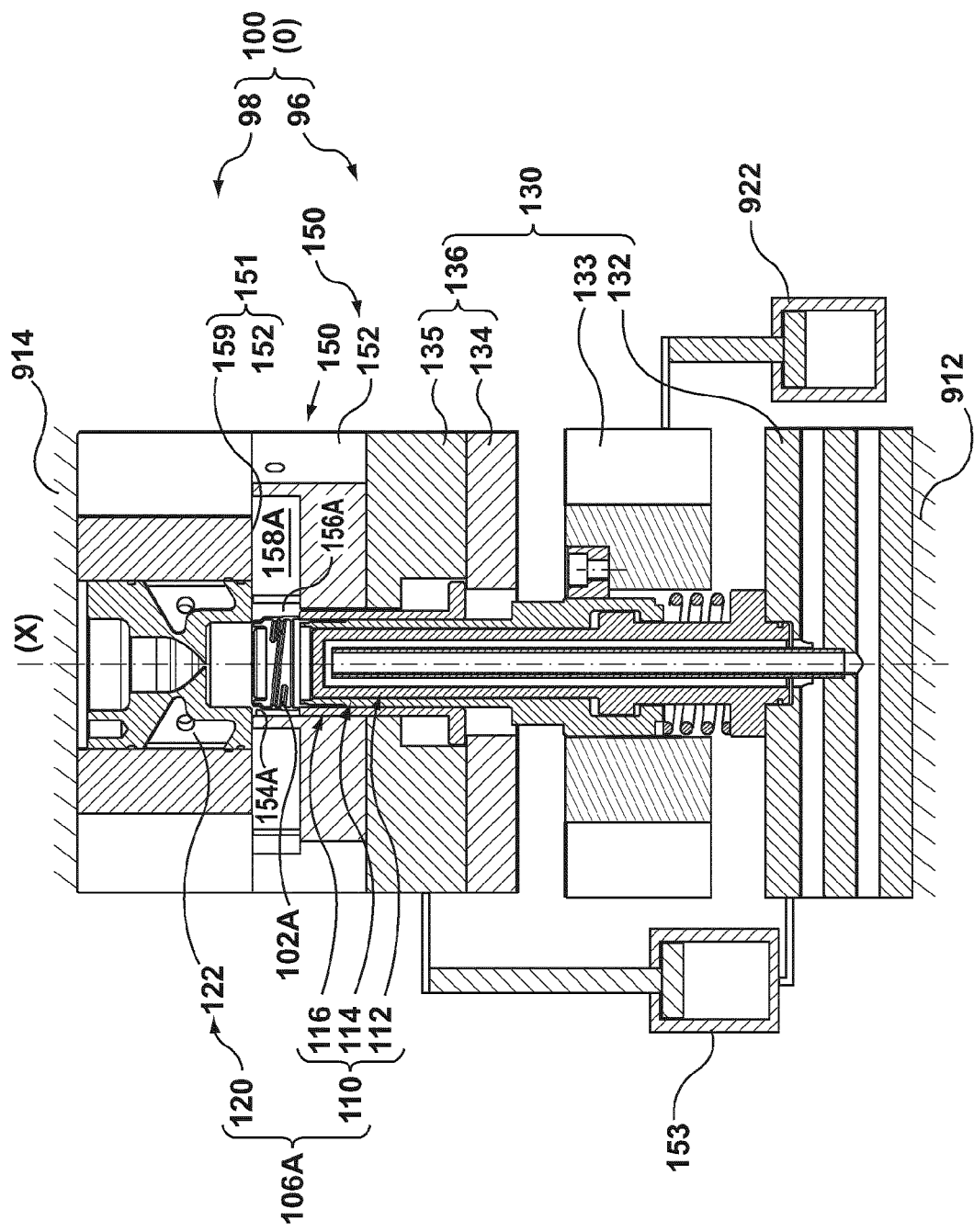
FIG. 2B depicts a section view through the portion of the injection mold depicted in FIG. 2A arranged in a mold open configuration.

As previously mentioned, the foregoing members of the first stack portion 110 are connected to the first mold shoe 130. Now, in more detail, the first mold shoe 130 includes a first core retainer 132, a second core retainer 133, and a stripper retainer 136 that are slidably connected together to accommodate the relative movement thereof, in use, along the mold-stroke axis X. As such, the inner core 112 is fixed to the first core retainer 132. The outer core 114 is slidably arranged within a passageway 139 that is defined in the second core retainer 133 and as such is movable relative thereto to accommodate, in use, movement thereof, along the mold-stroke axis X, from a outer core molding position (FIG. 2A) to a stripping position (FIG. 2B). Lastly, the stripper sleeve 116 is slidably retained within a pocket 138 that is defined in the stripper retainer 136 and as such is movable relative thereto to accommodate, in use, movement thereof, along the mold-stroke axis X, from a stripper sleeve molding position (FIG. 2A) to an ejection position (FIG. 2B). Of note, the stripper retainer 136 includes a base plate 134 and a top plate 135 that are fastened together, in use, to define the pocket 138 with a flange 123 of the stripper sleeve slidably retained therein.

Of further note, the inner core 112 is shown to be connected to the first core retainer 132 in a fluid tight manner to isolate a coolant circuit that is defined therein. The coolant circuit is defined between a coolant dispenser 193 and a space that is defined within the inner core 112 within which the coolant dispenser 193 is arranged. An end portion of the coolant dispenser 193 is connected to the first core retainer 132 and is otherwise arranged to direct coolant, in use, between a coolant inlet conduit 191 and a coolant outlet conduit 194 that are defined in the first core retainer 132. In operation, a coolant, such as water, is circulated through the coolant channel to remove heat from the inner core 112, and any of the other members of the first mold stack 106A that are thermally connected therewith, whereby the first molded article 102A may be rapidly cooled to ensure a faster molding cycle.

The relative movement between the first core retainer 132 and the stripper retainer 136 of the first mold shoe 130, along the mold-stroke axis X, may be driven, in use, by a stripper actuator 153 that is connected thereto. More particularly, with positioning of the injection mold 100 between a mold closed configuration C, as shown in FIG. 2A, and a mold open configuration O, as shown in FIG. 2B, with relative movement between the moving platen 912 and the stationary platen 914, the stripper actuator 153 is operable to extend and retract, as required, the stripper retainer 136 relative to the first core retainer 132 along the mold-stroke axis X. That being said, the stripper actuator 153 may be a spring-type actuator (e.g. coil, or air-spring) to bias the stripper retainer 136 to extend relative to the first core retainer 132, along the mold-stroke axis X, with opening of the injection mold 100, and that the retraction of the stripper retainer 136 relative to the first core retainer 132 may be provided with closing of the injection mold 100. Furthermore, the ejector actuator 922 of the clamping assembly 996 may be connected to the second core retainer 133 for a repositioning thereof, along the mold-stroke axis X.

Figure 3:
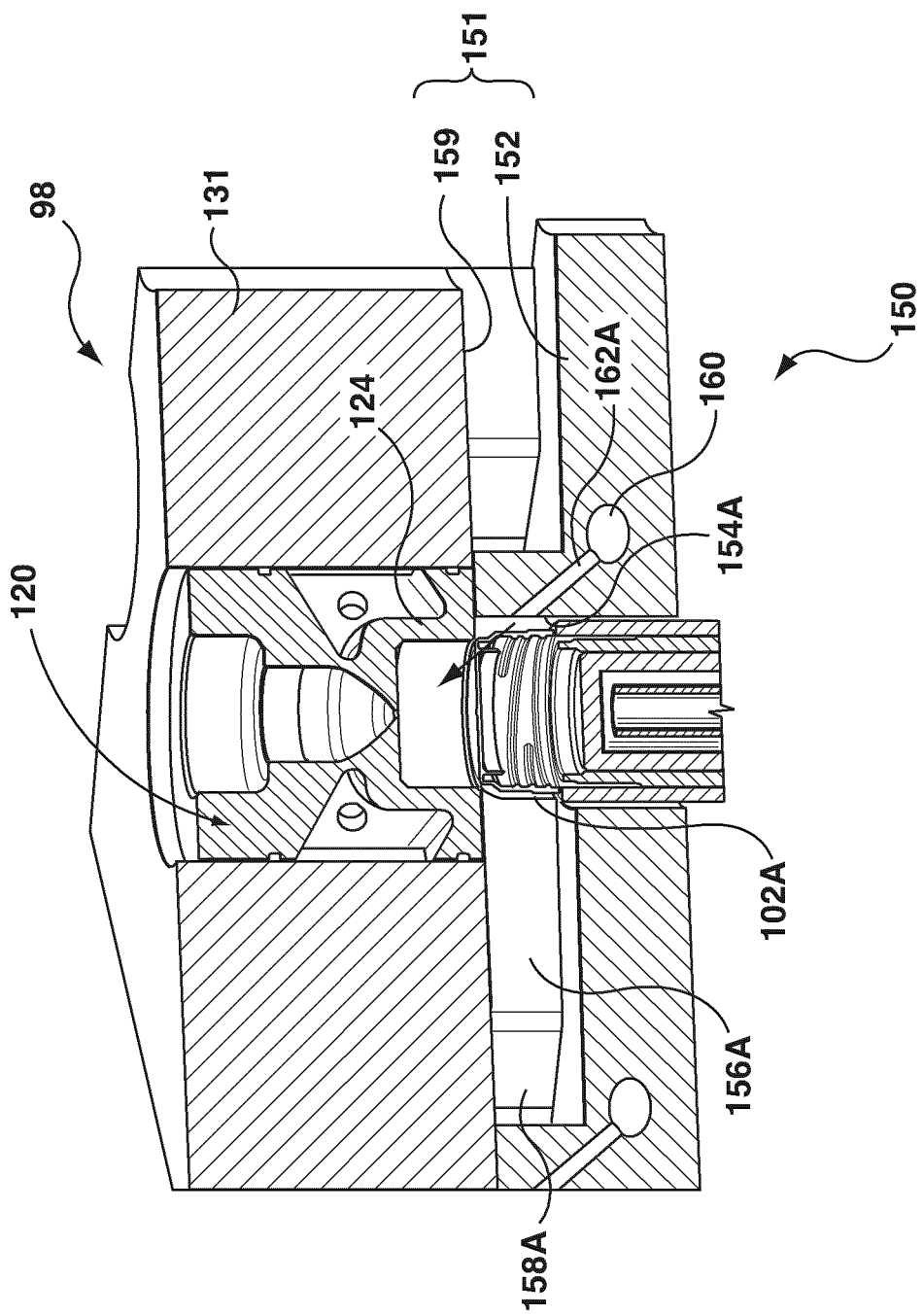
FIG. 3 depicts a perspective view of the portion of the injection mold of FIG. 2A that reveals a first nozzle that is associated with the molded article transfer device.
Figure 4:
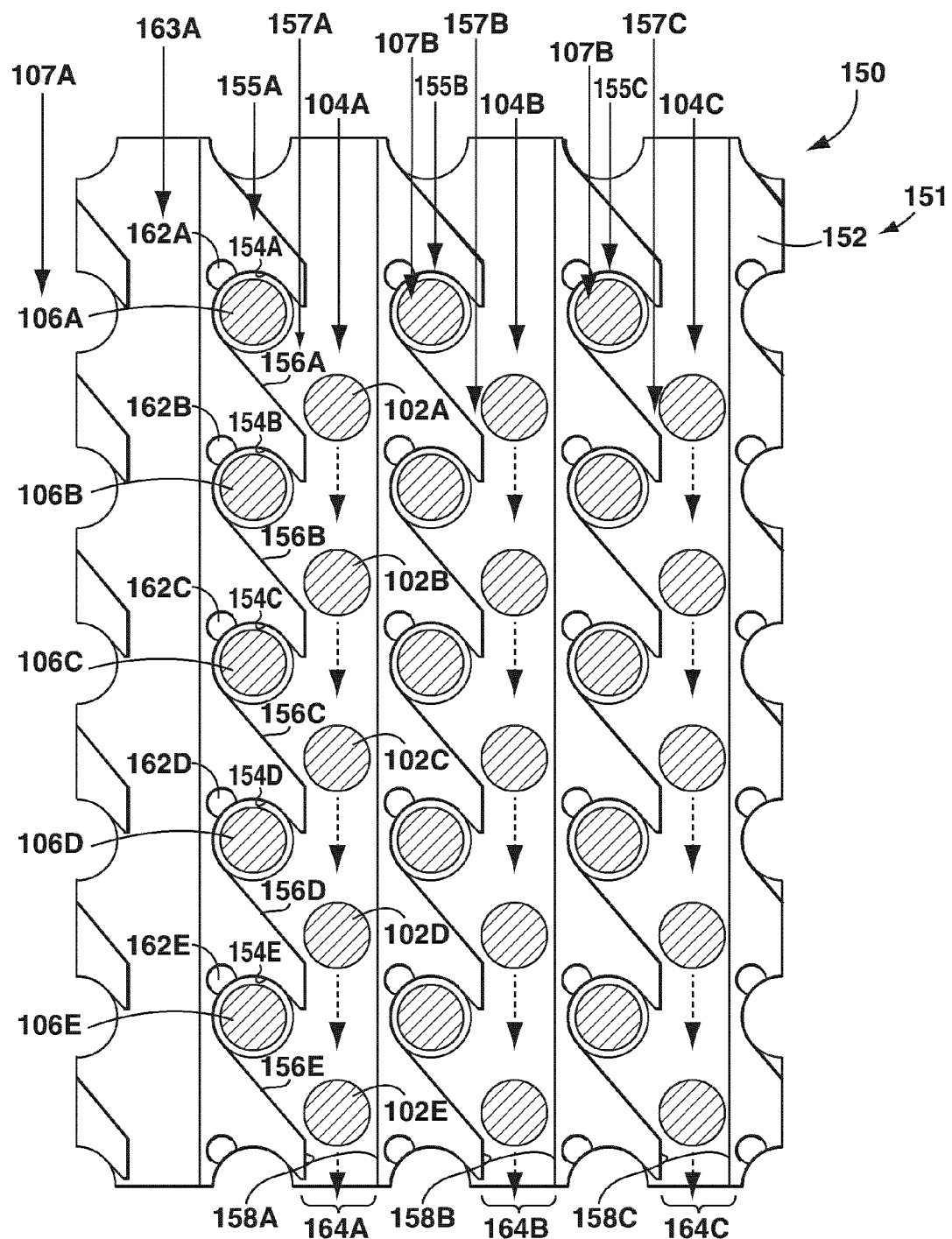
FIG. 4 depicts a front view of another portion of a first mold half of the injection mold of FIG. 1 including the molded article transfer device.

As previously mentioned, and as shown with reference to FIGS. 2A and 2B, the molded article transfer device 150 broadly includes a transfer structure 151 that defines a first aperture 154A. In operation, the first aperture 154A alternately accommodates: i) the first mold stack 106A arranged therein, as shown in FIG. 2A, and more particularly, and without limiting the generality of the foregoing, the first stack portion 110 thereof; and ii) the first molded article 102A received therein, as shown in FIG. 2B, with opening of the first mold stack 106A, along a mold-stroke axis X, to retract it from the first aperture 154A. As also shown in FIGS. 3 and 4, the transfer structure 151 further defines a first branch channel 156A and a first trunk channel 158A through which the first molded article 102A is passable upon ejection from the first stack portion 110. More particularly, the first branch channel 156A connects the first aperture 154A with the first trunk channel 158A for passing, in use, the first molded article 102A thereto, whereafter it passes through the first trunk channel 158A towards an exit 164A thereof. The first branch channel 156A and the first trunk channel 158A being arranged to extend in different directions. A technical effect of the foregoing may include being able to pass the first molded article 102A through the injection mold along a pathway that avoids other structures of the mold, not the least of which may include other mold stacks.

In the present non-limiting embodiment the transfer structure 151 includes, as shown with reference to FIG. 2A, a transfer plate 152 that is associated, in use, with the first mold half 96. The transfer plate 152 defines, in part, the first aperture 154A, the first branch channel 156A, and the first trunk channel 158A. The transfer structure 151 also includes a cooperating structure 159 that is provided by a front face of the second mold shoe 131 with which to enclose the first branch channel 156A and the first trunk channel 158A along at least a portion thereof. As such, the stripper retainer 153 is operable, during normal operation, to maintain the transfer plate 152 in contact with the cooperating structure 159 of the second mold shoe 131 throughout a period of time required to transfer the first molded article 102A through the molded article transfer device 150. In practice, the foregoing may include biasing the transfer plate 152 to remain in contact with the cooperating structure throughout relative movement between the first mold half 96 and the second mold half 98 between the mold closed configuration C, as shown in FIG. 2A, and the mold open configuration O, as shown in FIG. 2B. One exception to the foregoing is during the execution of a start-up molding process. As the name implies, the start-up molding process would typically be executed, although not exclusively, when starting the injection mold 100. As generally known, the start-up of an injection mold often requires manual intervention by a molding system operator to clear short-shots (i.e. molded articles that are only partially molded), to remove molded articles that stubbornly resist ejection (e.g. typically due to an over cooling thereof), or to remove flash (i.e. molding material that has seeped outside of the molding cavity 101), and the like. Thus, during start-up it may be necessary to position the first mold half 96 and the second mold half 98, along the mold-stroke axis X, such that a space is provided between the transfer plate 151 and the cooperating structure 159 of the second mold shoe 131 to provide ready access to each of the first stack portion 110 and the second stack portion 120.

Again with reference to FIGS. 3 and 4, it may be appreciated that the transfer structure 151 further defines a first nozzle 162A that is arranged to dispense fluid, as shown in FIG. 3, in a direction that urges the first molded article 102A that is received in the first aperture 154A to pass through the first branch channel 156A towards the first trunk channel 158A. The first nozzle 162A may furthermore be arranged to dispense the fluid through the first aperture 154A above the first molded article 102A and towards the second stack portion 120 to urge the first molded article 102A away from the second stack portion 120. A technical effect of the foregoing may include preventing the first molded article 102A from re-entering a cavity 124 that is defined in the cavity insert 122 of the second stack portion 120, upon ejection from the first stack portion 110, whereby the first molded article 102A is able to pass through the first branch channel 156A.

While the injection mold 100 thus far has been described as having a first mold stack 106A, it may otherwise include an array of mold stacks. Such an array of mold stacks may include one or more columns of mold stacks.

As such, the transfer structure 151, including the transfer plate 152, of the molded article transfer device 150 may further define, as shown with reference to FIG. 4, a first column of apertures 155A, including the first aperture 154A. The first column of apertures 155A alternately accommodates: i) a first column of mold stacks 107A of the injection mold 100 arranged therein, including the first mold stack 106A; and ii) a first column of molded articles 104A received therein, including the first molded article 102A, with opening of the first column of mold stacks 107A, along the mold-stroke axis X, to retract them from the first column of apertures 155A. Furthermore, the transfer structure 151 may define a first column of branch channels 157A, including the first branch channel 156A. Each of the first column of branch channels 157A being arranged to connect one of the first column of apertures 155A with the first trunk channel 158A for passing, in use, one of the first column of molded articles 107A thereto, whereafter they pass through the first trunk channel 158A towards the exit 164A thereof.

In a similar manner, and thus without further explanation, the transfer structure 151 may further define similar structure to transfer the molded articles produced by other columns of mold stacks. For sake of illustration, these similar structures have been identified in FIG. 4 as including cooperating structures of a second column of apertures 155B, a second column of branch channels 157B, and a second trunk channel 158B with which to transfer a second column of molded articles 104B from a second column of mold stacks 107B. Likewise, a third column of apertures 155C, a third column of branch channels 157C, and a third trunk channel 158C are provided with which to transfer a third column of molded articles 104C from a third column of mold stacks 107C.

As illustrated, the first trunk channel 158A is arranged in between the first column of apertures 155A and the second column of apertures 155B, the second trunk channel 158B is arranged in between the second column of apertures 155B and the third column of apertures 155C, and the third trunk channel 158C is in turn arranged to the other side of the third column of apertures 155C. Given the tight spacing between columns of mold stacks in a typical injection mold, the first column of apertures 155A and the first trunk channel 158A may be arranged to extend, although not exclusively, in parallel directions along a major portion thereof. Also, given the columnar arrangement of the mold stacks, each of the first column of branch channels 157A are arranged to extend away (i.e. at an angle) from the first column of apertures 155A to intersect with the first trunk channel 158A. Also, given that most injection molds are mounted in a horizontal-type injection molding system 900 (i.e. the mold-stroke axis X is horizontal), it is furthermore possible to arrange the first trunk channel 158A and each of the first column of branch channels 157A to extend in directions, wherein the first column of molded articles 104A are passable therethrough, in use, under influence of gravity. The foregoing arrangements may also be applied with regards to the remaining columns of apertures, branch channels and trunk channels.

The transfer structure 151 may also define a first column of nozzles 163A, included in which is the first nozzle 162A, each of which being arranged to dispense fluid, in use, in a direction that urges the first column of molded articles 104A that are received in the first column of apertures 155A to pass through the first column of branch channels 157A towards the first trunk channel 158A. Furthermore, the first column of nozzles 163A may be arranged to dispense fluid through the first column of apertures 155A above the first column of molded articles 104A and towards the second stack portion 120 of each of the first column of mold stacks 107A to urge the first column of molded articles 104A away from the second stack portion 120 of each of the first column of mold stacks 107A.

In a similar manner, and thus without further explanation, the transfer structure 151 may further define further columns of nozzles in association with the other columns of apertures and the like.

Figure 5:
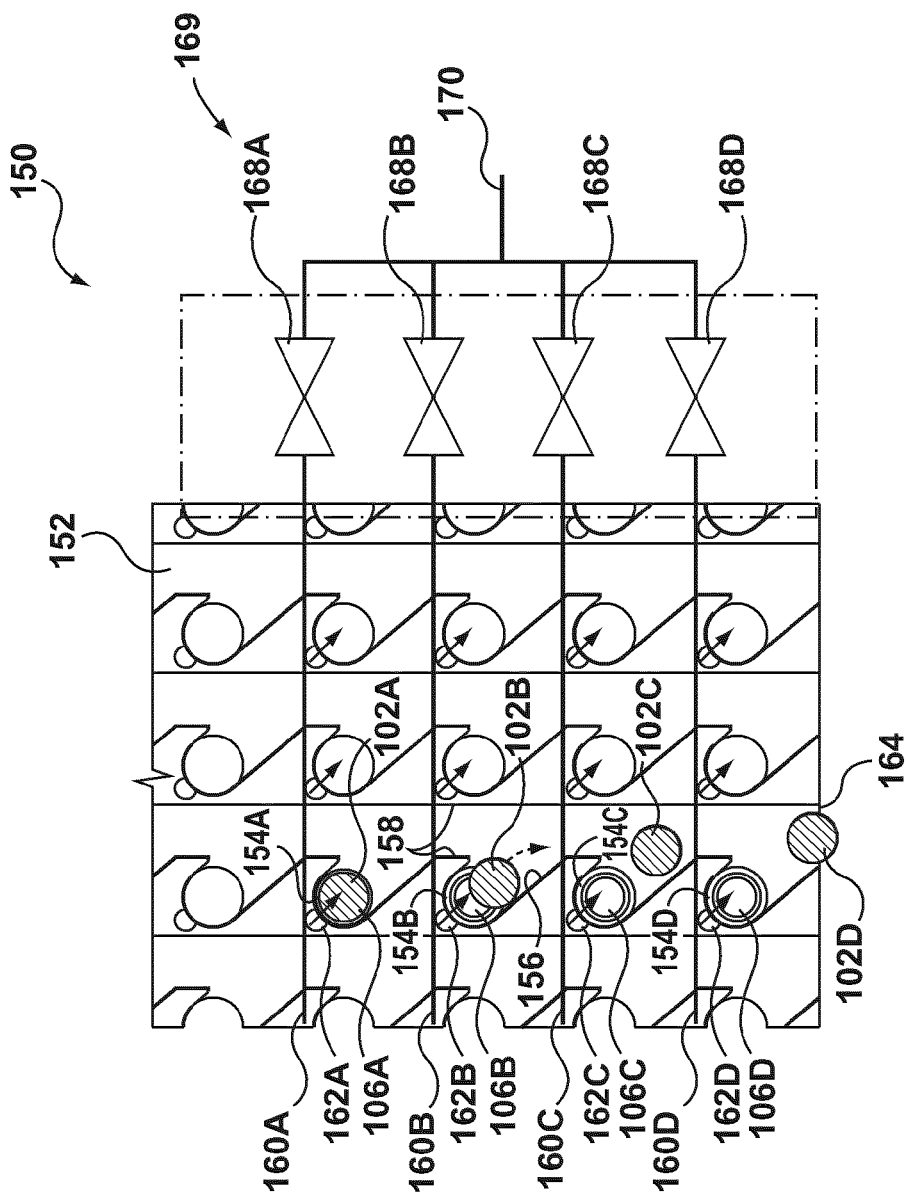
FIG. 5 depicts a front view of another portion of the first mold half including an alternate non-limiting embodiment of the molded article transfer device.

With reference to FIG. 5, the molded article transfer device 150 may further include a plurality of flow control devices 169 that are arranged between a fluid source 170 (e.g. air) and the first column of nozzles 163A for controlling flow of the fluid thereto. More particularly, of the four nozzles identified in the first column, namely the first nozzle 162A, a second nozzle 162B, a third nozzle 162C, and a fourth nozzle 162D, these are each separated from the fluid source via a corresponding one of a first valve 168A, a second valve 168B, a third valve 168C, and a fourth valve 168D that are connected thereto via a first line 160A, a second line 160B, a third line 160C, and a fourth line 160D. The valves may be controllable, such with a manually adjustable valve or an electrically operated spool valve, or may otherwise be a fixed pressure drop device such as an orifice valve and the like. As such, the plurality of flow control devices 169 may be configured to control the dispensing, in use, of fluid through the first column of nozzles 163A for sake of, for example, one or more of: i) dispensing of the fluid through at least the first nozzle 162A and the second nozzle 162B of the first column of nozzles 163A at different flow rates; ii) dispensing of the fluid through at least the first nozzle 162A and the second nozzle 162B of the first column of nozzles 163A over different intervals; iii) beginning dispensing of the fluid through at least the first nozzle 162A and the second nozzle 162B of the first column of nozzles 163A at different points in time.

Figure 6A:
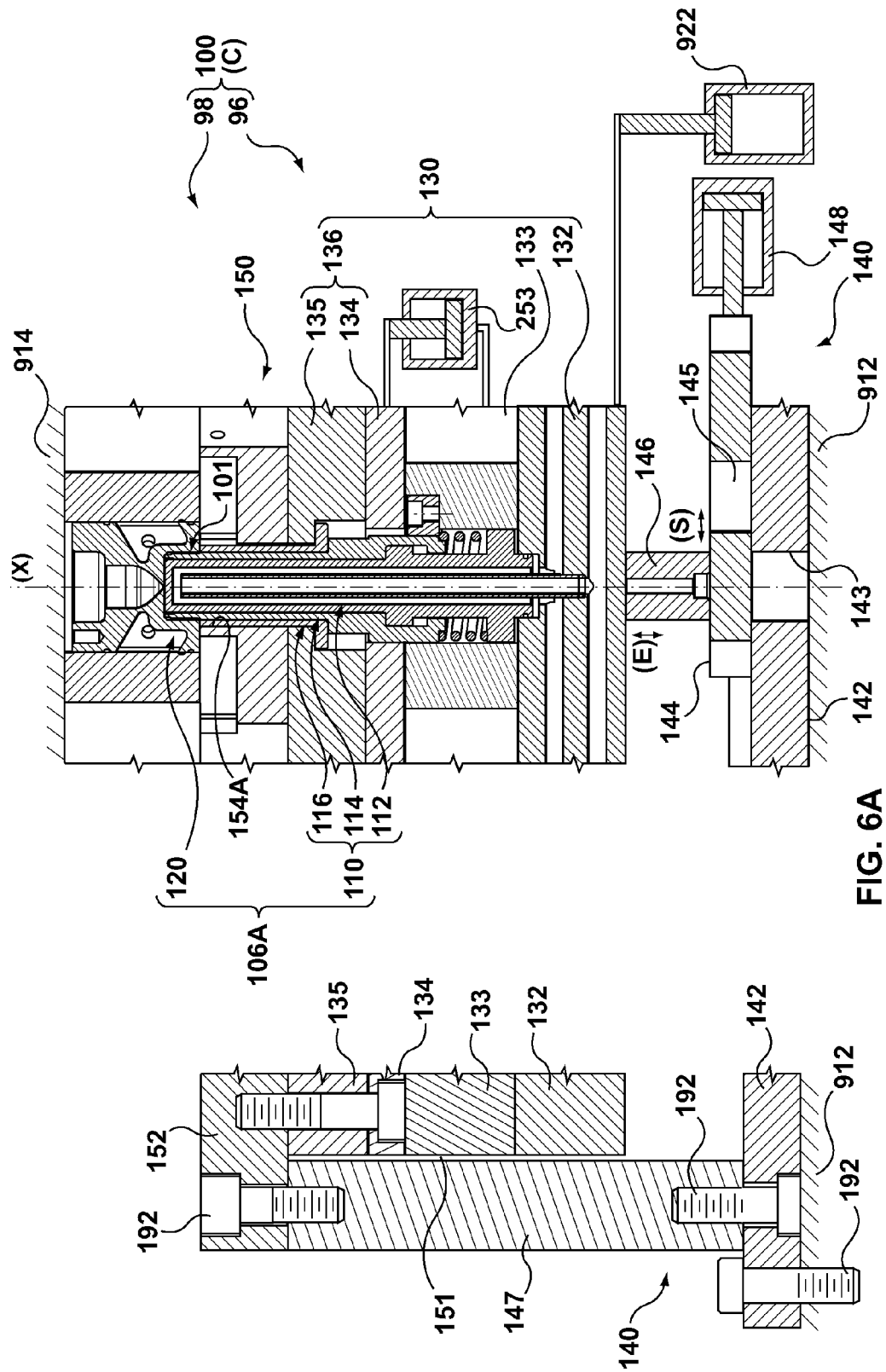

The focus of the description shall now shift to the construction and operation of an alternative non-limiting embodiment of the injection mold 100, as shown with reference to FIG. 6A, that further includes an in-mold shutter 140 such as that described in commonly assigned U.S. Patent Application 61/264,883 to Halter et al., filed on Nov. 30, 2009. With the inclusion of the in-mold shutter 140, it is possible to open and close the plurality of mold stacks, included in which is the first mold stack 106A, without having to keep repositioning the moving platen 912 relative to the stationary platen 914 to position the first mold half 96 and the second mold half 98 of the injection mold 100 between the mold closed configuration C, as shown in FIG. 2A, and the mold open configuration O, as shown in FIG. 2B. A technical effect of the foregoing may include, amongst others, a shortening of the molding cycle time, wherein a component of time that was formerly contributed by the certain operations of the clamping assembly 996 have been removed. That is, the production cycle no longer involves waiting for the clamp shutter 920 to be successively (i.e. with each molding cycle) un-shuttered and re-shuttered, and nor does it require waiting for the movements, to and fro, of the moving platen 912.

The in-mold shutter 140 is associated with the first mold half 96. More particularly, the in-mold shutter 140 is disposed between the moving platen 912 and the first mold shoe 130 of the injection mold 100. The in-mold shutter 140 broadly includes a shutter member 144 and a link member 146. As shown, the shutter member 144 is associated with the moving platen 912 of the clamping assembly 996, and the link member 146 is associated with the first mold shoe 130. In operation, the shutter member 144 is alternately selectively positioned, in use, in: i) a shut position S (FIG. 6A) and ii) an open position U (FIG. 6B). As such, the in-mold shutter 140 further includes a shutter actuator 148 that is connected to the shutter member 144, the shutter actuator 148 being operable, in use, to drive the movement of the shutter member 144 between the open position U and the shut position S. With the shutter member 144 arranged in the shut position S, as shown in FIG. 5A, the shutter member 144 is engaged with the link member 146, whereby the first mold shoe 130 is engaged with the moving platen 912. With the shutter member 144 arranged in the open position U, as shown in FIG. 6B, the shutter member 144 is disengaged from the link member 146, whereby the first mold shoe 130 may be moved, in use, along the mold-stroke axis X. The movement of the first mold shoe 130, along the mold-stroke axis X, may be driven, for example, by the ejector actuator 922 of the clamping assembly 996. The foregoing is schematically shown with reference to FIG. 6A, wherein the ejector actuator 922 is shown to be connected to the first core retainer 132.

The in-mold shutter 140 further includes a support base 142 upon which the shutter member 144 is slidably coupled, and wherein the support base 142 is structured to be fixedly connected, in use, by a fastener 192, or the like, to the moving platen 912. Furthermore, the link member 146 is connected to a back face of the first core retainer 132 of the first mold shoe 130. In this arrangement, the link member 146 is aligned with the first stack portion 110 of the first mold stack 106A. Likewise, where the injection mold 100 includes a plurality of mold stacks, included in which is the first mold stack 106A, with which to define a plurality molding cavities to mold, in use, a plurality of molded articles, such as that shown with reference to FIGS. 2A and 2B, the in-mold shutter 140 may further include a plurality of link members, included in which is the link member 146, wherein each of the plurality of link members is aligned with one of the plurality of mold stacks. That being said, no such specific limitation as to the number and arrangement of the link members is intended.

Figure 6C:
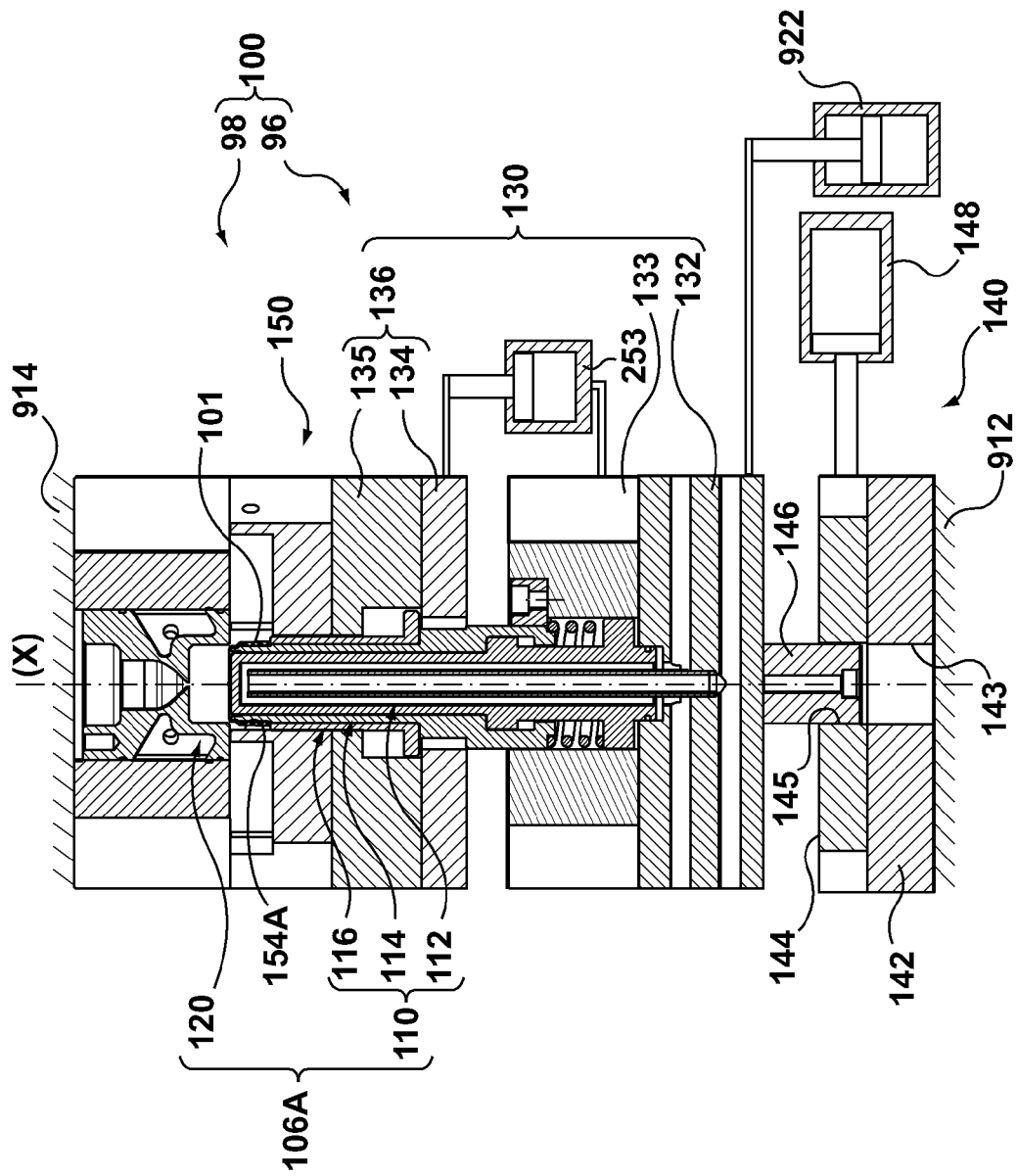
Figure 6D:
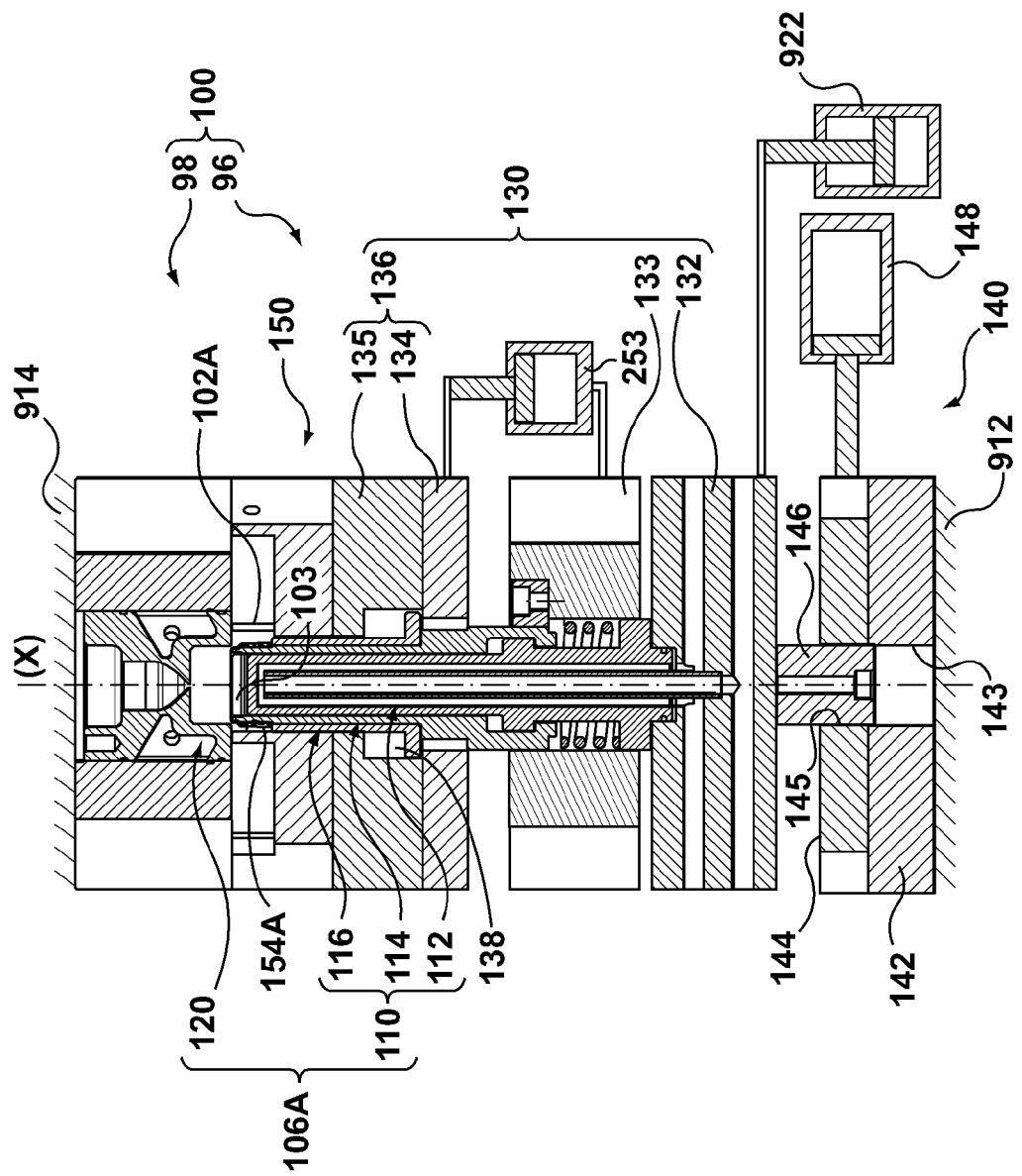
Figure 6E:
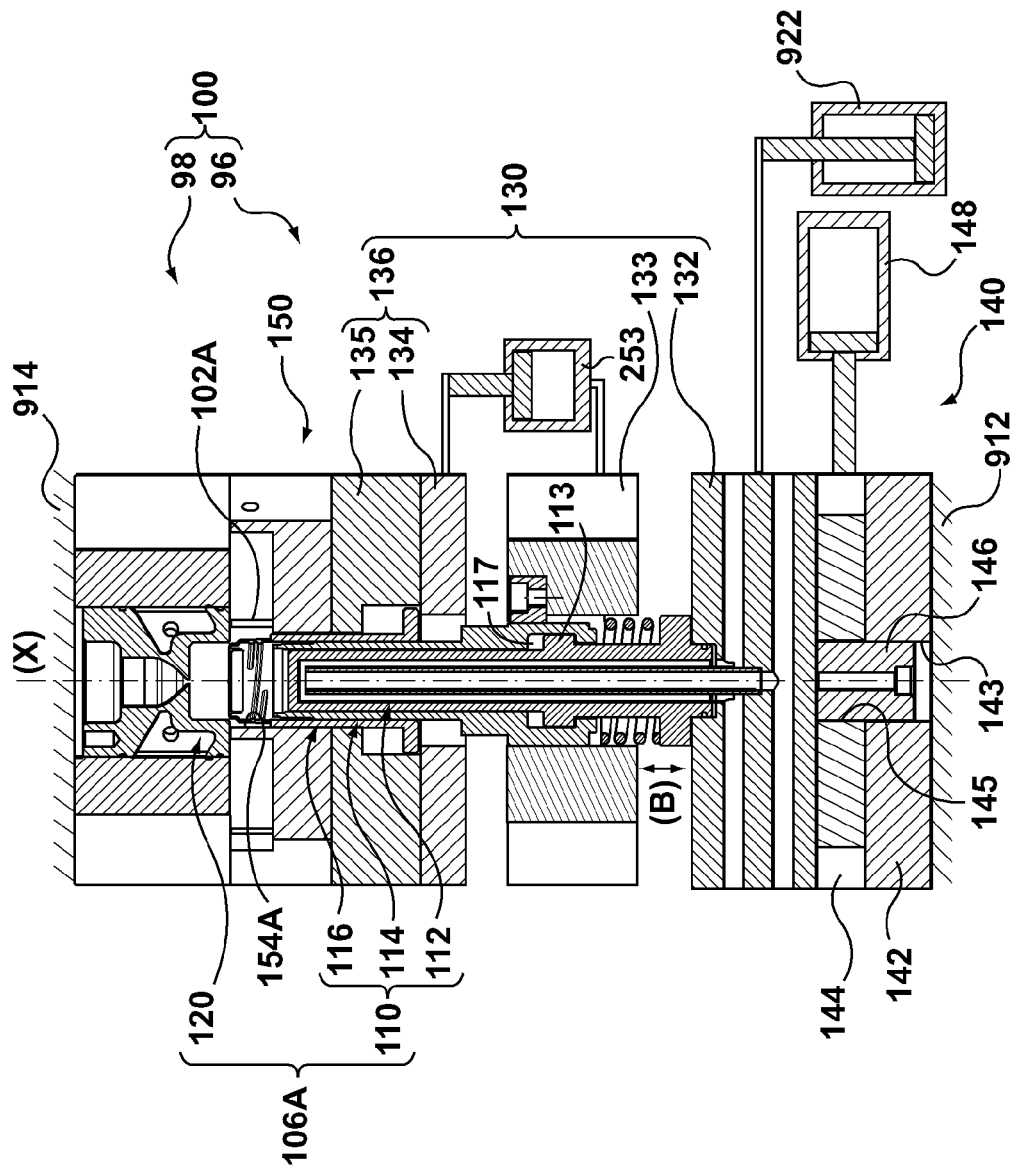

The shutter member 144 further defines a first clearance aperture 145 that is configured to accommodate the link member 146 being arranged therein, in use, with the shutter member 144 being positioned in the open position U (FIG. 6B) and with the movement of the first mold shoe 130, along the mold-stroke axis X, towards a retracted position B (FIG. 6E). Depending on the required stroke of the first mold shoe 130, the first clearance aperture 145 may be structured to extend, as shown, through the shutter member 144. Furthermore, the support base 142 may also define a second clearance aperture 143 that is aligned, in use, with the first clearance aperture 145, with positioning of the shutter member 144 into the open position U. As such, the second clearance aperture 143 is configured to accommodate the link member 146 being arranged therein, in use, with the shutter member 144 being positioned in the open position U and with the movement of the first mold shoe 130, along the mold-stroke axis X, towards the retracted position B.

The shape and size of the link member 146 in relation to those of the first clearance aperture 145 and the second clearance aperture 143 is not particularly limited so long as the link member 146 is arrangeable therethrough. In the present non-limiting example, the link member 146 has a cylindrical body, and wherein the first clearance aperture 145 and the second clearance aperture 143 are provided as complementary cylindrical bores.

As previously mentioned, the transfer plate 152 is associated, as shown in FIG. 2A, with the first mold half 96 of the injection mold 100. As such, the in-mold shutter 140 is further provided with an ejector box 147 with which to frame the first mold shoe 130 and otherwise couple, in use, the transfer plate 152 of the molded article transfer device 150 with the moving platen 912 of the injection molding system 900. More particularly, a fastener 192 connects the transfer plate 152 to a top of the ejector box 147 and another fastener 192 connects the support base 142 of the in-mold shutter 140 to a bottom of the ejector box 147, recalling that the support base 142 is fixedly connected, in use, by a fastener 192, or the like, to the moving platen 912. Furthermore, the ejector box 147 defines a space 149 within which the first core retainer 132 and the second core retainer 133 may be moved, in use, along the mold-stroke axis X. It is worth noting that in this non-limiting embodiment, the stripper retainer 136 is fastened to the transfer plate 152. As previously mentioned, the movement of the first mold shoe 130, along the mold-stroke axis X, may be driven, at least in part, by the ejector actuator 922 of the clamping assembly 996. More particularly, the ejector actuator 922 is shown to be connected to the first core retainer 132 for a repositioning thereof. Furthermore, and as shown in FIG. 6A, the injection mold 100 further includes a stripper actuator 253 that is connected to the stripper retainer 136 and the second core retainer 133, the stripper actuator 253 being operable, in use, to move the second core retainer 133 relative to the stripper retainer 136 along the mold-stroke axis X.

An injection molding process involving the injection mold 100 having an in-mold shutter 140 is illustrated in FIGS. 6A-6G. The molding process begins, as shown in FIG. 2A, with the injection mold 100 being positioned in the mold closed configuration C with the first mold shoe 130 being positioned, along the mold-stroke axis X, in an extended position E such that the first mold stack 106A is closed to define the molding cavity 101 therein. In so doing, the first mold stack 106A is arranged within the first aperture 154A that is defined by the transfer plate 152 molded article transfer device 150. Furthermore, the shutter member 144 of the in-mold shutter 140 is in the shut position S, whereby the first mold shoe 130 is engaged with the moving platen 912. Accordingly, the injection mold 100 is configured for molding of the first molded article 102A. Thereafter, molding of the first molded article 102A (not shown) is performed with injection of molding material into the molding cavity 101.

The injection molding process next includes, as shown with reference to FIG. 6B, the un-shuttering of the in-mold shutter 140 to disengaged the first mold shoe 130 from the moving platen 912. The un-shuttering of the shutter member 144 includes shifting the shutter member 144 into the open position U, through control of the shutter actuator 148, wherein the shutter member 144 is disengaged from the link member 146.

The injection molding process next includes, as shown with reference to FIG. 6C, opening of the first mold stack 106A with retracting the first stack portion 110, along the mold-stroke axis X, to position the first molded article 102A that is arranged thereon in the first aperture 154A. This involves retracting the first core retainer 132 and the second core retainer 133, along the mold-stroke axis X, and thus the retracting of the inner core 112 that is retained thereto, wherein the outer core 114 and the stripper sleeve 116 retract with the inner core 112 by virtue being linked together therewith by the first molded article 102A. The retracting of the first core retainer 132 and the second core retainer 133 is provided through control of the ejector actuator 922 and the stripper actuator 253, respectively.

The injection molding process next includes, as shown with reference to FIG. 6D, a first stage of arranging the first stack portion 110 to eject the first molded article 102A into the first aperture 154A, and more particularly the stripping of the seal portion 103 of the first molded article 102A from where it was molded in between the inner core 112 and the outer core 114 with relative movement thereof. As shown, with the completion of the last step the stripper sleeve 116 has reached its rearward limit of travel within the pocket 138 and thus the first molded article 102A is prevented from retracting any further with the inner core 112 or the outer core 114. As such, the present step involves retracting the first core retainer 132, through control of the ejector actuator 922, to retract the inner core 112 that is retained thereon, along the mold stroke axis X, a distance, relative to the outer core 114 which is kept immobile by virtue of being arranged within the first molded article 102A, that is sufficient to strip the seal portion 103.

The injection molding process next includes, as shown with reference to FIG. 6E, a final stage of arranging the first stack portion 110 to eject the first molded article 102A into the first aperture 154A, and furthermore opening of the first mold stack 106A with retracting of the first stack portion 110 from the first aperture 154A. The foregoing involves retracting the first core retainer 132, along the mold stroke axis X, into the retracted position B, through control of the ejector actuator 922, to retract the inner core 112 that is retained thereon a distance that is sufficient to further move the outer core 114 into stripping position by virtue of the inner core 112 having reached its rearward limit of travel relative to the outer core 114 as defined by the bayonet 113 in cooperation with the bayonet pocket 117. The first molded article 102A is stripped from the outer core 114 as it is held in the first aperture 154A, through supporting contact with a top of the stripper sleeve 116, and the outer core 114 is retracted therefrom with its retraction to the stripping position.

Figure 6F:
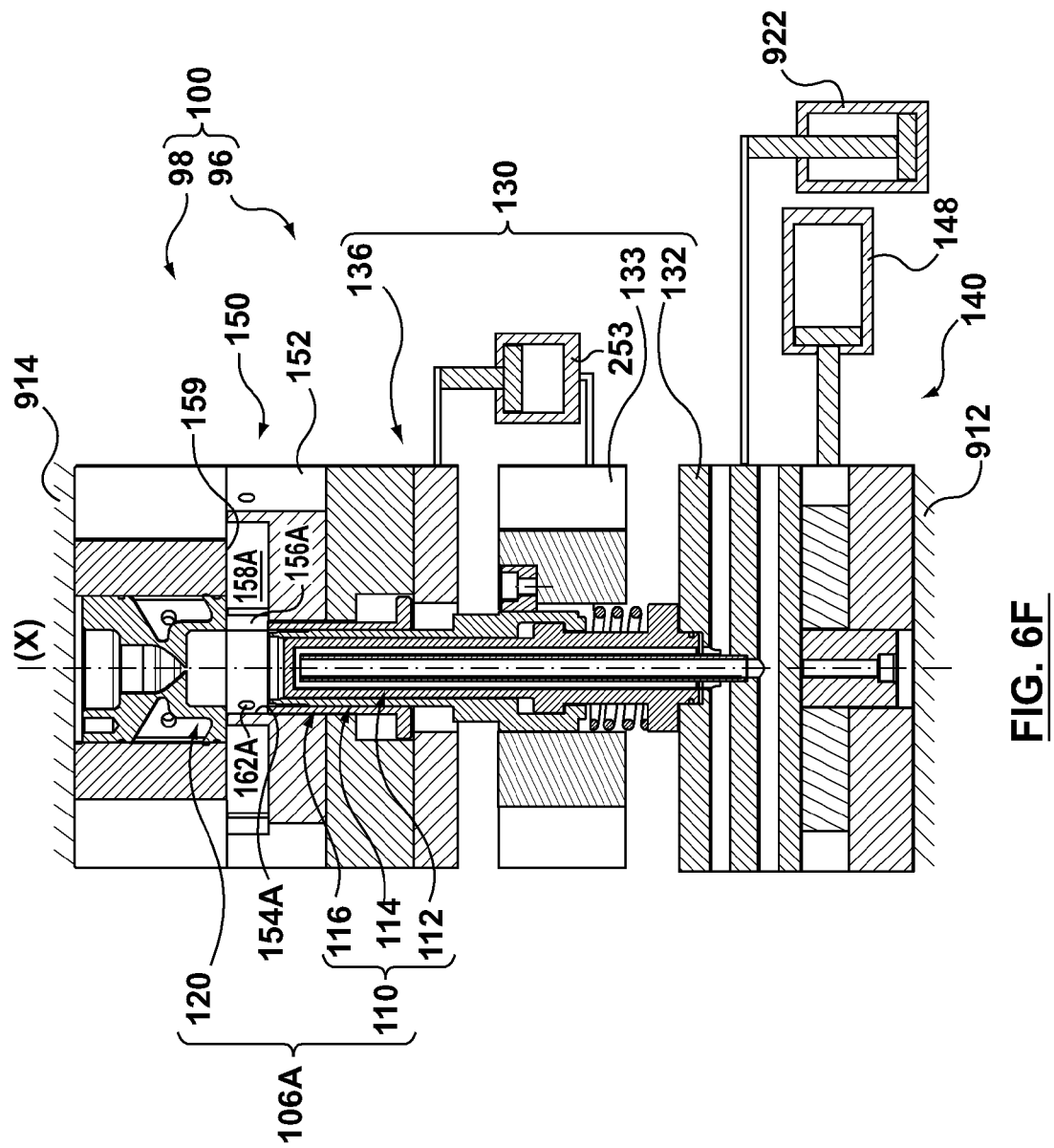

The injection molding process next includes, as shown with reference to FIG. 6F, dispensing fluid through the first nozzle 162A to urge the first molded article 102A (not shown) to pass from the first aperture 154A through the first branch channel 156A to the first trunk channel 158A. Once received in the first trunk channel 158A, the first molded article 102A passes therethrough to the exit 164A (FIG. 4) thereof under the influence of gravity and/or with the assistance of air or some other fluid being directed therethrough.

Figure 6G:
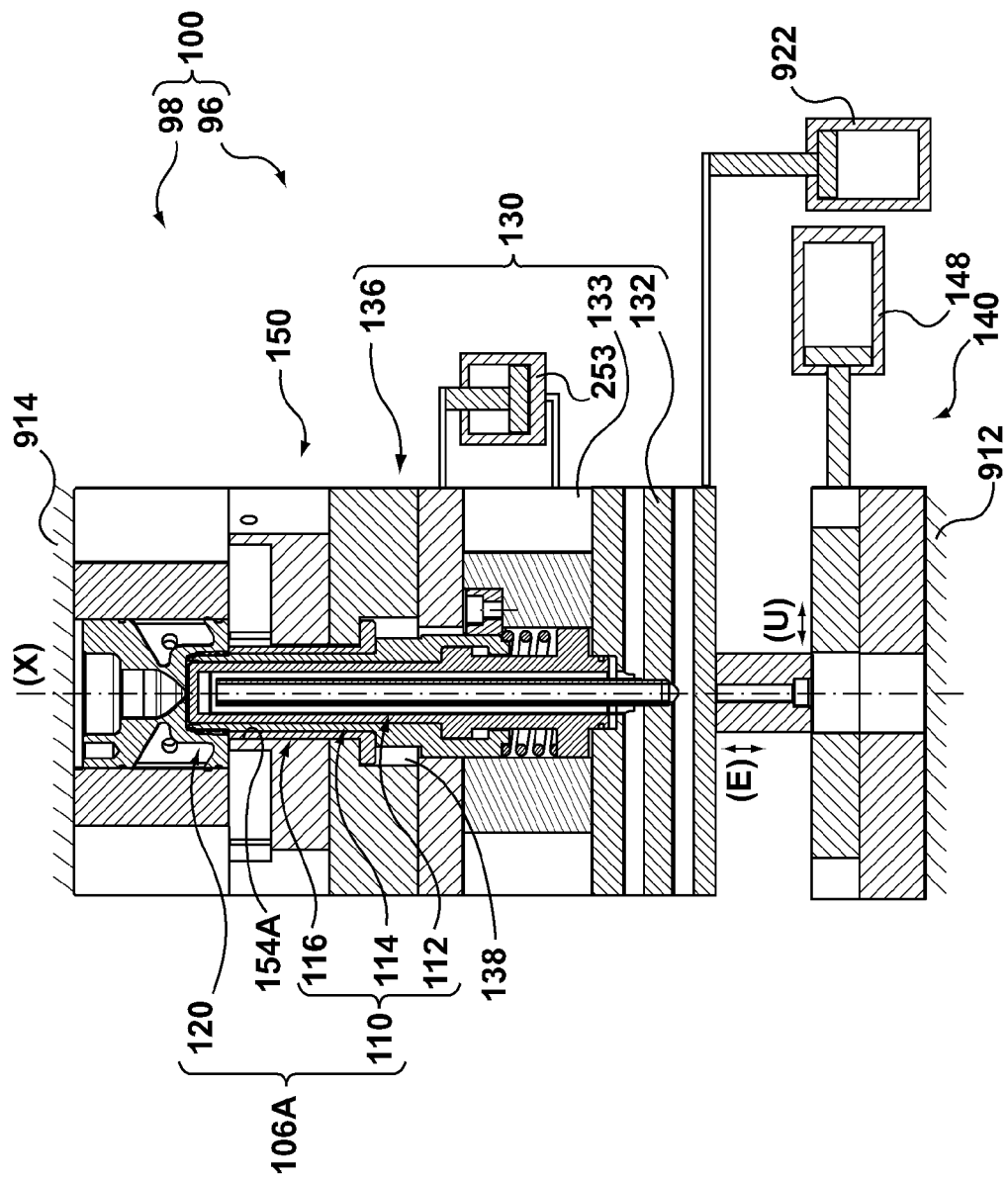

The injection molding process ends, as shown with reference to FIG. 6G, with closing of the first mold stack 106A. The closing of the first mold stack 106A involves rearranging the first mold shoe 130 into the extended position E with extension of the first core retainer 132 and the second core retainer 133, along the mold stroke axis X, through control of the ejector actuator 922, and the stripper actuator 253, respectively, to extend the inner core 112 and the outer core 114 into their respective molding positions and in so doing push the stripper sleeve 116 to its molding position with sliding movement thereof within the pocket 138. While not shown, prior to molding of the another of the first molded article 102A, there is a further requirement for shuttering of the in-mold shutter 140 to engage the first mold shoe 130 to the moving platen 912.

Figure 7:
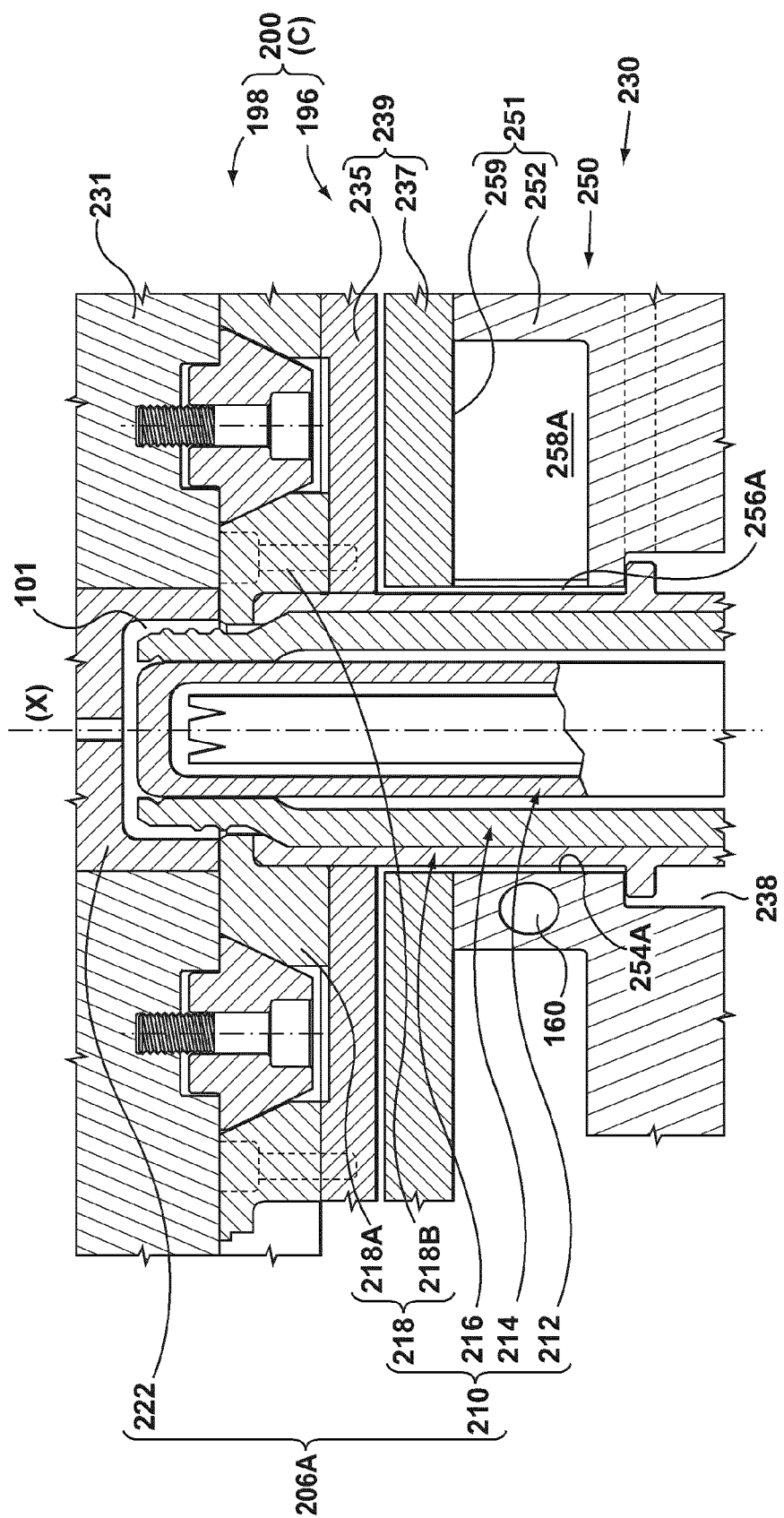
FIG. 7 depicts a section view through a portion of an alternate non-limiting embodiment the injection mold arranged in a mold closed configuration.

The focus of the description shall now shift to the construction and operation of another alternative non-limiting embodiment of the injection mold 200, as shown with reference to FIG. 7. The injection mold 200 is structured similarly to the injection mold 100 of FIG. 2A, and as such only the differences of construction and operation thereof will be described in detail in the description that follows.

One such difference is that the first mold half 196 and the second mold half 198 of the injection mold 200, and more particularly the first mold stack 206A, the first mold shoe 230, and the second mold shoe 231 thereof, have been structured to accommodate a pair of movable split mold inserts 218 with which to mold an encapsulated portion of the first molded article 102A (which in the present example is a tamper evident band of a bottle closure).

More particularly, the first stack portion 210 includes an inner core 212, an outer core 214, a stripper sleeve 216 and the pair of split mold inserts 218 that cooperate, in use, with a cavity insert 222 of the second stack portion 220 to define the molding cavity 101.

Likewise, the first mold shoe 230 is most notably different than the first mold shoe 130 described previously in that it now also includes a split insert retainer 239 with which to retain and operate, in use, the pair of split mold inserts 218. The structure and operation of the split insert retainer 239 is well known in the art and thus will not be described in detail herein. Suffice it to state that the first retainer includes, as shown, a split retainer plate 237 to which a pair of connecting bars 235 are slidably mounted. The pair of split mold inserts 218, namely a first split half 218A and a second split half 218B, are mounted to the pair of connecting bars 235, and thus are retained for movement with the split insert retainer 239. In operation, the pair of connecting bars 235 are movable along an axis that is generally perpendicular to the mold-stroke axis X, whereby the first split half 218A and the second split half 218B are moved between a closed and an open configuration to form an encapsulated portion of the molding cavity 101 and otherwise release the encapsulated portion of the first molded article 102A, respectively.

The molded article transfer device 250 is different than the molded article transfer device 150 described previously in that the transfer plate 252 defines a pocket 238 beneath the first aperture 254A within which to slidably retain the stripper sleeve 216 to accommodate, in use, movement thereof along the mold-stroke axis X. Another difference is that the molded article transfer device 250 is arranged between the split insert retainer 239 and the other members (not shown) of the first mold half 230. In this way, the transfer structure 251 that defines a first branch channel 256A and a first trunk channel 258A also includes the cooperating structure 259 that is provided on a rear face of a split insert retainer 239. That is, the cooperating structure 259 encloses the first branch channel 256A and the first trunk channel 258A of the molded article transfer device 250.

Figure 8:
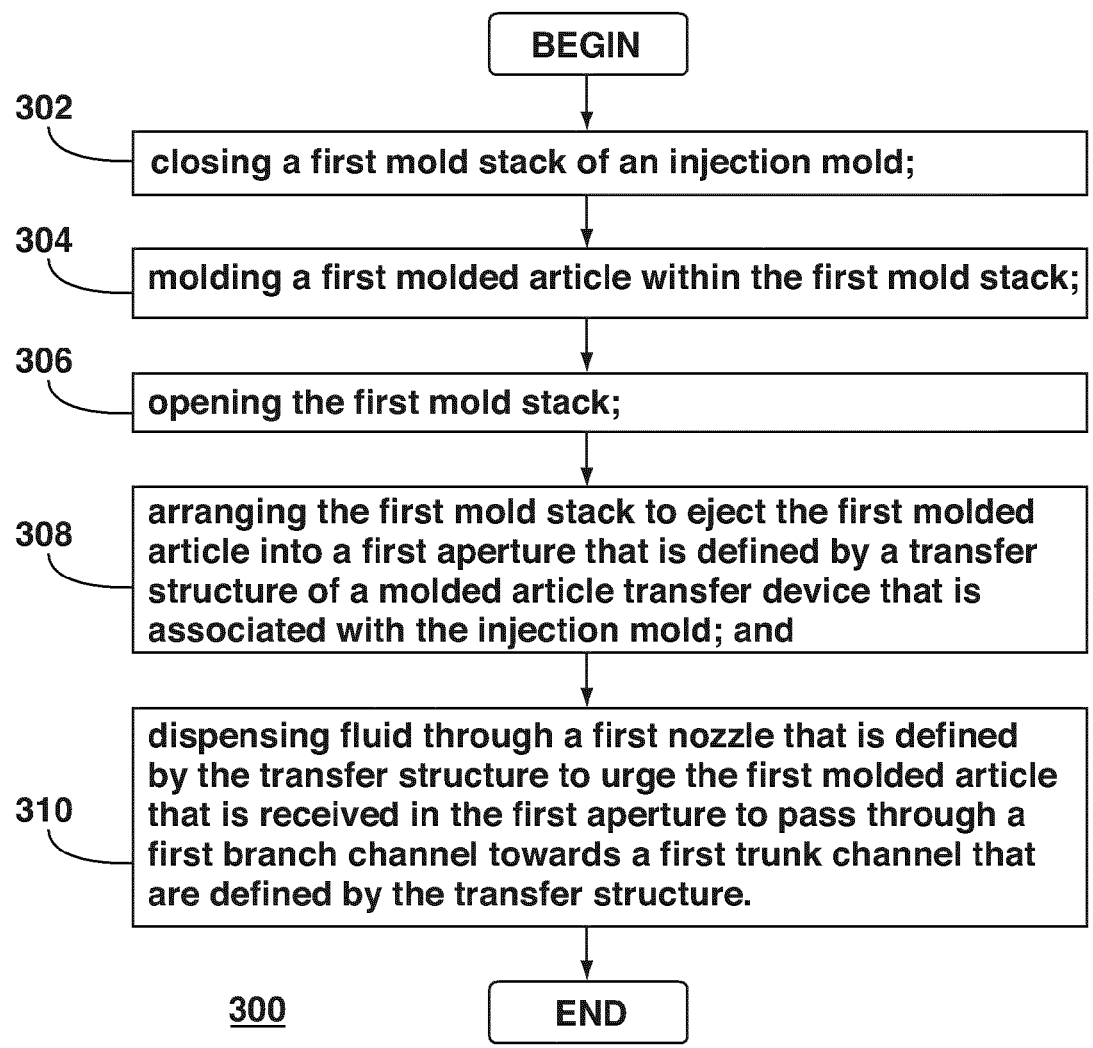
FIG. 8 depicts a flow chart of a first aspect of the injection molding process.

The focus of the description shall now shift to the description of an injection molding process 300, as shown in FIG. 8, that is executable on a controller 501, as shown with reference to FIG. 1, such as the one that is typically associated with the injection molding system 900. The controller 501 is shown to be connected to the platen-moving actuator 915 and the ejector actuator 922 of the injection molding system 900 for the control thereof. Likewise, some or all of the stripper actuator 153, 253, the shutter actuator 148, and the plurality of flow control devices 169 may be similarly connected thereto.

Accordingly, the controller 501 may include instructions 512 that are embodied in a controller-usable memory 510 of the controller 501, the instructions 512 for directing the controller 501 to execute the molding process 300, as shown in FIG. 8, that includes the steps of:
(i) closing 302 the first column of mold stacks 107A of the injection mold 100, 200, wherein the first column of mold stacks 107A are arranged within the first column of apertures 155A;
(ii) molding 304 a first column of molded articles 104A within the first column of mold stacks 107A;
(iii) opening 306 the first column of mold stacks 107A to retract them from the first column of apertures 155A;
(iv) arranging 308 the first column of mold stacks 107A to eject the first column of molded articles 104A into the first column of apertures 155A; and
(v) dispensing 310 fluid through the first column of nozzles 163A to urge the first column of molded articles 104A that are received in the first column of apertures 155A to pass through a first column of branch channels 157A towards the first trunk channel 158A that are defined by the transfer structure 151.

Furthermore, the step of dispersing 310 may further include controlling the plurality of flow control devices 169 for controlling flow of the fluid through the first column of nozzles 163A for sake of one or more of: dispensing 310 of the fluid through at least the first nozzle 162A and the second nozzle 162B of the first column of nozzles 163A at different flow rates; dispensing 310 the fluid through at least the first nozzle 162A and the second nozzle 162B of the first column of nozzles 163A over different intervals; and/or beginning the dispensing 310 of the fluid through at least the first nozzle 162A and the second nozzle 162B of the first column of nozzles 163A at different points in time.

It is also worth noting that the sequence in which the molding process 300 is to be executed is not particularly limited. For example, the steps of opening 306 and the arranging 308 of the first column of mold stacks 107A may be performed sequentially or concurrently, at least in part.

It is noted that the foregoing has outlined some of the more pertinent non-limiting embodiments. These non-limiting embodiments may be used for many applications. Thus, although the description is made for particular arrangements and methods, the intent and concept of these non-limiting embodiments may be suitable and applicable to other arrangements and applications. It will be clear to those skilled in the art that modifications to the disclosed non-limiting embodiments can be effected. The described non-limiting embodiments ought to be construed to be merely illustrative of some of the more prominent features and applications thereof. Other beneficial results can be realized by applying these non-limiting embodiments in a different manner or modifying them in ways known to those familiar with the art. This includes the mixing and matching of features, elements and/or functions between various non-limiting embodiments is expressly contemplated herein, unless described otherwise, above.

What is claimed is:

1. A molded article transfer device that is associated, in use, with an injection mold, the molded article transfer device comprising:
a transfer structure that defines:
a first aperture that is structured to receive a first molded article from a first mold stack of the injection mold;
a first branch channel and a first trunk channel through which the first molded article is passable;
the first branch channel connects the first aperture with the first trunk channel for passing, in use, the first molded article thereto, whereafter it passes through the first trunk channel towards an exit thereof.

2. The molded article transfer device of claim 1, wherein:
the first branch channel and the first trunk channel extend in different directions.

3. The molded article transfer device of claim 1, wherein:
the first aperture is structured to alternately accommodate:
(i) the first mold stack of the injection mold arranged therein; and (ii) the first molded article received therein with opening of the first mold stack, along a mold-stroke axis, to retract it from the first aperture.

4. The molded article transfer device of claim 1, wherein:
the transfer structure further defines a first nozzle that is arranged to dispense fluid, in use, in a direction that urges the first molded article that is received in the first aperture to pass through the first branch channel towards the first trunk channel.

5. The molded article transfer device of claim 3, wherein:
with the first molded article received in the first aperture, with relative positioning of a first stack portion and a second stack portion of the first mold stack, along the mold-stroke axis, the first nozzle being arranged to dispense the fluid through the first aperture above the first molded article and towards the second stack portion to urge the first molded article-away from the second stack portion.

6. The molded article transfer device of claim 3, wherein:
the transfer structure defines:
a first column of apertures, including the first aperture, that alternately accommodate: (i) a first column of mold stacks of the injection mold arranged therein, including the first mold stack; and (ii) a first column of molded articles received therein, including the first molded article, with opening of the first column of mold stacks, along the mold-stroke axis, to retract them from the first column of apertures;
a first column of branch channels, including the first branch channel;
each of the first column of branch channels being arranged to connect one of the first column of apertures with the first trunk channel for passing, in use, one of the first column of molded articles thereto, whereafter they pass through the first trunk channel towards the exit thereof.

7. The molded article transfer device of claim 6, wherein:
the transfer structure defines a first column of nozzles;
each of the first column of nozzles being arranged to dispense fluid, in use, in a direction that urges the first column of molded articles that are received in the first column of apertures to pass through the first column of branch channels towards the first trunk channel.

8. The molded article transfer device of claim 6, wherein:
with the first column of molded articles received in the first column of apertures, with relative positioning of a first stack portion and a second stack portion of each of the first column of mold stacks, along the mold-stroke axis, the first column of nozzles being arranged to dispense fluid through the first column of apertures above the first column of molded articles and towards the second stack portion of each of the first column of mold stacks to urge the first column of molded articles away from the second stack portion of each of the first column of mold stacks.

9. The molded article transfer device of claim 7, further comprising:
a plurality of flow control devices;
the plurality of flow control devices being arranged between a fluid source and the first column of nozzles for controlling flow of the fluid thereto.

10. The molded article transfer device of claim 9, wherein:
the plurality of flow control devices being configured to control the dispensing, in use, of the fluid through the first column of nozzles for one or more of:
dispensing of the fluid through at least a first nozzle and a second nozzle of the first column of nozzles at different flow rates;
dispensing of the fluid through at least the first nozzle and the second nozzle of the first column of nozzles over different intervals;
beginning dispensing of the fluid through at least the first nozzle and the second nozzle of the first column of nozzles at different points in time.

11. The molded article transfer device of claim 6, wherein:
the transfer structure defines:
a second column of apertures within which to receive a second column of molded articles from a second column of mold stacks that are associated with the injection mold;
a second column of branch channels and a second trunk channel;
each of the second column of branch channels being arranged to connect one of the second column of apertures with the second trunk channel for passing, in use, one of the second column of molded articles thereto, whereafter they pass through the second trunk channel towards the exit thereof.

12. The molded article transfer device of claim 11, wherein:
the first trunk channel is arranged in between the first column of apertures and the second column of apertures.

13. The molded article transfer device of claim 12, wherein:
the second trunk channel is arranged in between the second column of apertures and a third column of apertures.

14. The molded article transfer device of claim 6, wherein:
the first column of apertures and the first trunk channel extend in parallel directions along a major portion thereof;
each of the first column of branch channels extend away from the first column of apertures.

15. The molded article transfer device of claim 6, wherein:
the first trunk channel and each of the first column of branch channels extend in directions wherein the first column of molded articles are passable therethrough, in use, under influence of gravity.

16. The molded article transfer device of claim 6, further comprising:
a transfer plate that is associated, in use, with one of a first mold half and a second mold half of the injection mold;
the transfer structure includes the transfer plate, wherein the transfer plate defines, at least in part, one or more of the first column of apertures, the first column of branch channels, and the first trunk channel.

17. The molded article transfer device of claim 16, wherein:
the transfer structure further includes a cooperating structure on at least one of a first mold shoe and a second mold shoe that are associated with the first mold half and the second mold half, respectively.

18. The molded article transfer device of claim 17, wherein:
the cooperating structure is provided on a front face of the second mold shoe,
wherein the first column of branch channels and the first trunk channel are enclosed along at least a portion thereof by the cooperating structure.

19. The molded article transfer device of claim 17, wherein:
the cooperating structure is provided on a rear face of a split insert retainer that is associated with the first mold shoe,
wherein the first column of branch channels and the first trunk channel are enclosed along at least a portion thereof by the cooperating structure.

20. The molded article transfer device of claim 16, wherein:
the transfer plate defines a pocket beneath each of the first column of apertures within which to slidably retain a stripper sleeve of each of the first column of mold stacks to accommodate, in use, movement thereof along the mold-stroke axis.

21. The molded article transfer device of claim 16, wherein:
the transfer plate is mounted, in use, to an ejector box of an in-mold shutter to couple the molded article transfer device with a moving platen of an injection molding system.

22. A controller including instructions being embodied in a controller-usable memory of the controller, the instructions for directing the controller to execute a molding process, comprising:
closing a first mold stack of an injection mold;
molding a first molded article within the first mold stack;
opening the first mold stack;
arranging the first mold stack to eject the first molded article into a first aperture that is defined by a transfer structure of a molded article transfer device that is associated with the injection mold; and
dispensing fluid through a first nozzle that is defined by the transfer structure to urge the first molded article that is received in the first aperture to pass through a first branch channel towards a first trunk channel that are defined by the transfer structure.

23. The controller of claim 22, wherein:
closing further includes closing of a first column of mold stacks, including the first mold stack, wherein the first column of mold stacks are arranged within a first column of apertures, including the first aperture, that are defined by the transfer structure;
molding a first column of molded articles, including the first molded article, within the first column of mold stacks;
opening the first column of mold stacks to retract them from the first column of apertures;
arranging the first column of mold stacks to eject the first column of molded articles into the first column of apertures; and
dispensing the fluid through a first column of nozzles, including the first nozzle that are defined by the transfer structure to urge the first column of molded articles that are received in the first column of apertures to pass through a first column of branch channels, including the first branch channel, towards the first trunk channel.

24. The controller of claim 23, wherein:
dispensing of the fluid includes controlling a plurality of flow control devices that are arranged between a fluid source and the first column of nozzles for controlling flow of the fluid through the first column of nozzles for one or more of:
dispensing of the fluid through at least the first nozzle and a second nozzle of the first column of nozzles at different flow rates;
dispensing the fluid through at least the first nozzle and the second nozzle of the first column of nozzles over different intervals;
beginning dispensing of the fluid through at least the first nozzle and the second nozzle of the first column of nozzles at different points in time.

25. The controller of claim 23, wherein:
the opening and the arranging of the first column of mold stacks are performed concurrently, at least in part.

* * * * *